Nov. 19, 1957     J. M. PAGE     2,813,472
COTTON CHOPPER
Filed April 9, 1956
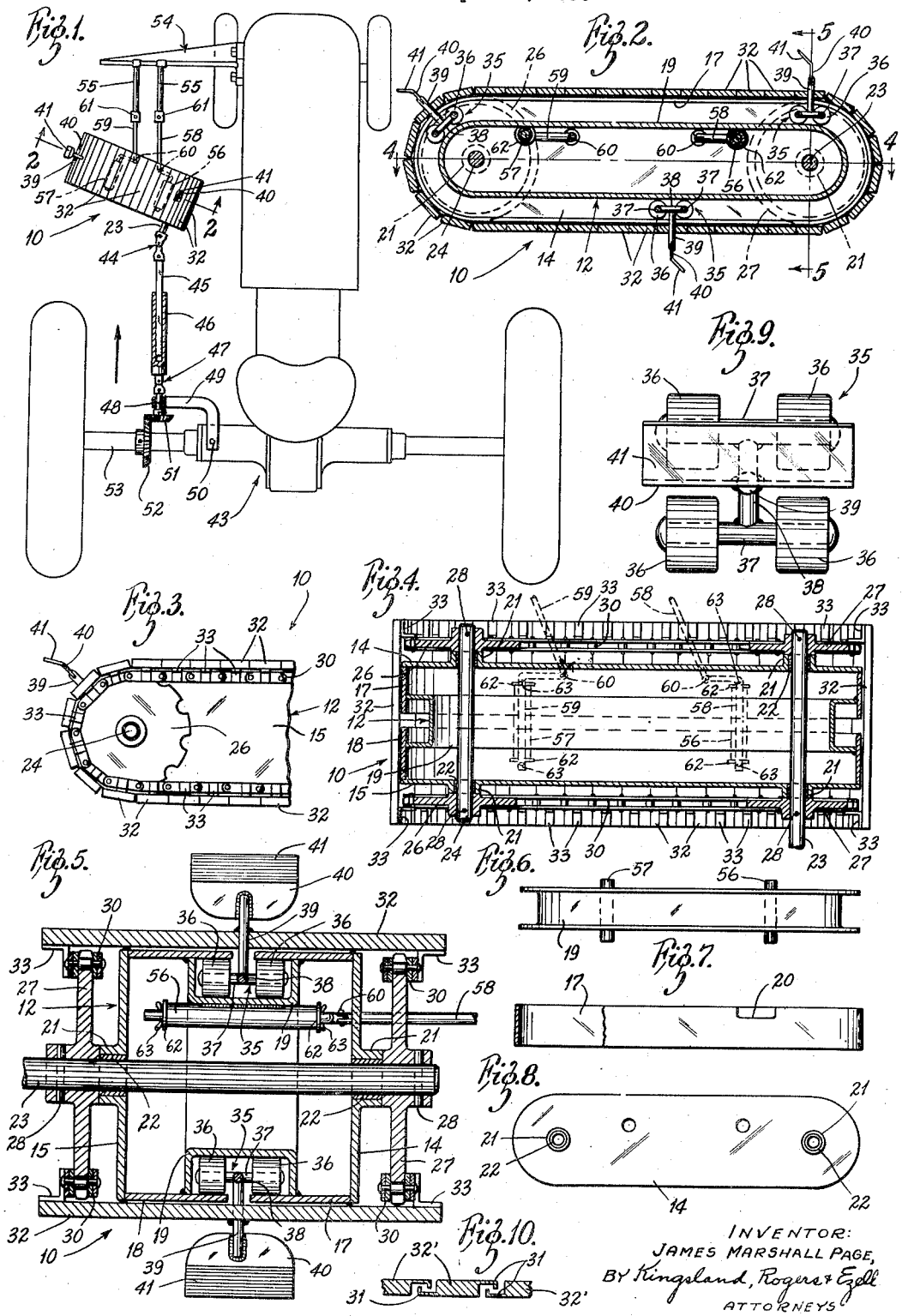
INVENTOR:
JAMES MARSHALL PAGE,
BY Kingsland, Rogers & Ezell
ATTORNEYS

United States Patent Office 2,813,472
Patented Nov. 19, 1957

2,813,472

COTTON CHOPPER

James Marshall Page, Lutesville, Mo.

Application April 9, 1956, Serial No. 576,872

2 Claims. (Cl. 97—20)

The present invention relates generally to farming apparatus, and more particularly to a novel cotton chopper of the continuous chain type.

Various types of cotton choppers have been made over the past century, or more, but in the applicant's experience none of those in use adequately combine efficiency and simplicity. This is particularly so in the type of cotton chopper in which the blades are moved about a continuous closed path.

In brief, the present invention comprises a frame on which are mounted two pairs of sprockets receiving two parallel chains. Small four-wheel dollies are provided which roll about the frame in a protected track, each dolly supporting a chopper blade or hoe. The dollies are driven by the chains in a continuous predetermined path. In one installation, power for the sprockets and chains is obtained from the rear axle of a tractor upon which the cotton chopper is adjustably mounted for support. Preferably, the present cotton chopper is adjustable vertically and horizontally.

An object of the present invention is to provide a novel cotton chopper of the continuous chain type which is efficient in operation and which overcomes the deficiencies of earlier choppers of the same and similar types.

Another object is to provide a novel cotton chopper of the continuous chain type which may be readily mounted upon a tractor for vertical and horizontal adjustment.

Another object is to provide a novel cotton chopper of the continuous chain type in which the cotton chopper blades are moved substantially at right angles across the cotton row or rows, in a positive cutting action and in timed relation to the forward movement of the tractor supporting the cotton chopper, and in which a track for guiding the cotton chopper blades is protected against dirt and the like.

Another object is to provide a novel cotton chopper of the continuous chain type which is of sturdy construction and adapted to give long service.

Other objects are to provide a cotton chopper of the continuous chain type which may be readily attached to a tractor for use, which may be employed by the farmer with a minimum of instruction, and which otherwise fulfills the objects and advantages sought therefor.

The foregoing and other objects and advantages are apparent from the following description taken with the accompanying drawing, in which:

Figure 1 is a diagrammatic view of a tractor illustrating the attachment thereto of an embodiment of the novel cotton chopper forming the subject matter of the present invention;

Figure 2 is an enlarged vertical cross-sectional view taken substantially on the line 2—2 of Figure 1;

Figure 3 is a fragmentary side elevational view of the present novel cotton chopper;

Figure 4 is a horizontal cross-sectional view taken substantially on the line 4—4 of Figure 2;

Figure 5 is a further enlarged transverse vertical cross-sectional view taken substantially on the line 5—5 of Figure 2;

Figure 6 is a plan view on a reduced scale of the dolly track forming part of the present novel cotton chopper;

Figure 7 is a plan view on a reduced scale, partially broken away, of one of the dolly retaining members;

Figure 8 is a side elevational view on a reduced scale of the forward side plate forming part of the frame;

Figure 9 is an enlarged top plan view of a chopper hoe and dolly; and

Figure 10 is an enlarged cross-sectional view of a modified transverse bar construction.

Referring to the drawing more particularly by reference numerals, 10 indicates generally a cotton chopper incorporating the concepts of the present invention. The cotton chopper 10 includes a frame 12, illustrated as fabricated, comprising a forwardly disposed side plate 14, a rearwardly disposed side plate 15, opposed dolly retaining members 17 and 18 of continuous substantially flattened elliptical form, as is clear from Figure 7, and a dolly track 19 of substantially flattened elliptical form. As is clear from Figure 5, the members 17 and 18 are welded to the side plates 14 and 15, respectively, and the dolly track 19 is welded to the members 17 and 18 to provide a rigid structure. Each member 17 and 18 includes a notch 20 in the upper reach for removal of a dolly described below. It will be noted that the dolly track 19 is of U-cross section. The frame 12 may include additional reinforcing, if desired, and the several members may be secured together by suitable brackets and nuts and bolts, or otherwise, rather than welding, if preferred.

Each of the side plates 14 and 15 includes two spaced apertured bosses 21, which may be formed integral therewith or may be secured thereto, in each of which is a suitable bearing 22 which may be press-fitted into secured relation therewith. Opposed bearings 22 support shafts 23 and 24 which extend therethrough.

Th shaft 24 supports a pair of sprockets 26 and the shaft 23 a pair of sprockets 27, which are identical. The sprockets 26 and 27 are disposed exteriorly of the frame 12, as is clear from Figure 5, and preferably are secured to the respective shafts by suitable pins 28. Each pair of aligned sprockets 26 and 27 supports a continuous chain 30 so that all four sprockets 26, 27 move simultaneously.

Transverse bars 32 are supported on the chains 30 for continuous movement therewith by suitable brackets 33, which are welded to the bars 32 and to links of the chains 30, although bolts may be employed if desired. The bars 32 are contiguous as shown to prevent dirt from falling into the track 19.

A modified bar 32' is shown in Figure 10, which includes flanges 31. The flanges 31 interlock to prevent dirt from falling into the track 19.

Dollies 35 are provided for movement in the track 19, each of which comprises four rollers 36 mounted upon spaced stub shafts 37 secured together by a link 38 welded thereto, as shown. A vertically extending shaft 39 is welded to the link 38, which, when in operative position, extends through an opening in a selected transverse bar 32 at which point it is permanently affixed as by welding, as is clear from Figures 3 and 5. To the free end of each shaft 39 is welded a chopper hoe 40 having a cutting edge 41 disposed at a selected angle to the shaft 39.

Power for continuous rotation of the chopper hoes 40 may be derived from a tractor 43 as illustrated in Figure 1. The shaft 23 extends rearwardly and has secured to the free end thereof a universal coupling 44. To the other end of the universal coupling 44 is secured a shaft 45, preferably of square cross section, which is telescopically received within an elongated hollow shaft 46 having a complementary internal square cross section to receive the same. To the other end of the shaft 46 is secured a universal point 47, the other end of the latter being secured to a stub shaft 48 rotatably mounted in a bearing bracket 49 secured to the tractor 43 at 50. A bevel gear 51 is secured to the other end of the stub shaft 48 and is in mesh with a larger bevel gear 52 mounted upon the axle 53 of the tractor 43 for rotation therewith.

The two universal joints 44 and 47 and the telescopic shafts 45 and 46 permit vertical and horizontal adjustment of the cotton chopper 10, yet provide a positive drive for the chopper hoes 40.

Preferably, the cotton chopper 10 is supported from a standard cultivator attachment 54 mounted on the tractor 43 which has pivotally mounted parallel hollow arms 55. Spaced pipe members 56 and 57 are welded or otherwise secured beneath the track member 19, as is clear from the drawings, which receive supporting shafts 58 and 59, respectively, each of which has a horizontally pivotal joint 60. The free ends of the shafts 58 and 59 extend into the arms 55 telescopically and are secured in place by standard clamps 61, or the like. Suitable washers 62 and pins 63 maintain the shafts 58 and 59 against removal.

It is to be understood that suitable levers of standard construction (not shown) are mounted upon the tractor 43 convenient to the operator and are secured to the arms 55 for raising and lowering the cotton chopper 10, and for maintaining it in the desired position for chopping cotton or for carrying purposes, which may be power or manually actuated. Horizontal adjustment of the cotton chopper 10 in order to dispose it at the desired angle to the row of cotton is accomplished by moving one or the other of the shafts 58 and 59 into or out of the arms 55, which is permitted through the horizontal pivotal joints 60.

In operation, the cotton chopper 10 is adjusted to the desired height and at the desired angle to the row of cotton before the tractor 43 is moved forwardly in the cotton chopping operation. It will be noted that the cotton chopper 10 is disposed at an angle so that the chopper hoes 40 will move transversely across the row of cotton at substantially right angle thereto as the tractor 43 moves forwardly.

As the tractor 43 moves forwardly, rotation of the axle 53 will effect rotation of the shaft 23 and therethrough rotation of the sprockets 26, 27, and thereby continuous flattened elliptical movement of the chopper hoes 40. Three chopper hoes 40 have been provided, but a greater or a lesser number may be employed as required.

It is manifest that the present cotton chopper 10 may be readily employed by a user to efficiently chop out cotton.

The hoe 40 may be of any desired width, but one of about eight inches in width gives a satisfactory performance when the machine is geared to leave a stand of about two inches between eight inch cut-outs.

It is apparent that there has been provided a cotton chopper which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A cotton chopper comprising a frame, a continuous substantially closed dolly track forming part of said frame of flat elliptical form, said dolly track being in a substantially vertical plane, a dolly mounted in said dolly track, a cotton chopper blade secured to said dolly and disposed externally of said frame, spaced pairs of sprockets mounted on said frame, parallel chains trained about said sprockets, bars secured to said chains and extending transversely across said frame, said bars being in substantially contiguous relationship to minimize the entry of dirt, or the like, into the dolly track, said chopper blade including a shaft extending through a selected bar for movement therewith, and power means for driving said sprockets.

2. A cotton chopper comprising a frame including opposed side members having substantially flattened elliptical form and a continuous substantially closed dolly track of substantially flattened elliptical form mounted between said side members, said dolly track being in a substantially vertical plane, a plurality of dollies mounted in said dolly track, a shaft extending vertically from each dolly, a cotton chopper blade secured to the free end of each shaft, spaced pairs of sprockets secured on shafts supported by said side members, parallel chains trained about said sprockets, substantially contiguous cross bars secured to said chains for movement therewith, each dolly shaft being secured to a cross bar for movement therewith, and means for driving said sprockets.

References Cited in the file of this patent
UNITED STATES PATENTS

| | | |
|---|---|---|
| 252,135 | Paddock | Jan. 10, 1882 |
| 517,047 | Johnson | Mar. 27, 1894 |
| 1,033,789 | De Weese | July 30, 1912 |
| 1,254,999 | Felker et al. | Jan. 29, 1918 |